United States Patent [19]
Morrison

[11] Patent Number: 5,517,433
[45] Date of Patent: May 14, 1996

[54] PARALLEL DIGITAL DATA COMMUNICATIONS

[75] Inventor: Robert E. Morrison, Los Alamos, N.M.

[73] Assignee: Remote Intelligence, Inc., Minneapolis, Minn.

[21] Appl. No.: 271,172

[22] Filed: Jul. 7, 1994

[51] Int. Cl.[6] .............................. G06J 1/00; H03C 5/00; H04J 1/00
[52] U.S. Cl. ..................... 364/602; 375/268; 370/69.1
[58] Field of Search .............................. 364/602; 375/37, 375/38, 41, 17, 259, 260, 268, 286; 370/69.1, 120, 123

[56] References Cited

U.S. PATENT DOCUMENTS

| | | |
|---|---|---|
| 2,948,889 | 8/1960 | Kuehl . |
| 2,975,410 | 3/1961 | Groce et al. . |
| 3,263,185 | 7/1966 | Lender . |
| 3,305,634 | 2/1967 | Rusick . |
| 3,485,949 | 12/1969 | De Haas . |
| 3,579,110 | 5/1971 | Hauber . |
| 3,654,492 | 4/1972 | Clark . |
| 3,757,309 | 9/1973 | Hashizume et al. . |
| 3,763,322 | 10/1973 | Garcia et al. . |
| 3,810,019 | 5/1974 | Miller . |
| 3,912,869 | 10/1975 | Ullakko . |
| 3,990,071 | 11/1976 | Ito et al. . |
| 4,042,787 | 8/1977 | Richards . |
| 4,347,617 | 8/1982 | Dakin et al. ............................. 375/17 |
| 4,425,666 | 1/1984 | Groth, Jr. . |
| 4,601,045 | 7/1986 | Lubarsky . |
| 4,602,131 | 7/1986 | Soulliard et al. . |
| 4,635,278 | 1/1987 | Maloon et al. ......................... 370/69.1 |
| 4,660,215 | 4/1987 | Horiike et al. . |
| 4,675,619 | 6/1987 | Uchibori et al. .......................... 375/41 |
| 4,802,190 | 1/1989 | Schouhamer Immink . |
| 4,823,265 | 4/1989 | Nelson . |
| 4,999,831 | 3/1991 | Grace .................................... 370/69.1 |
| 5,225,906 | 7/1993 | Sin . |
| 5,261,060 | 11/1993 | Free . |

Primary Examiner—Tan V. Mai
Attorney, Agent, or Firm—Palmatier, Sjoquist & Helget

[57] ABSTRACT

A method and apparatus for transmitting parallel digital data bit patterns over a single line is disclosed. Parallel digital data bit patterns are transformed into analog signals that are representative of the digital data bit patterns. Each digital data bit pattern is assigned an analog representation (either frequency, phase, or amplitude depending on the transmission medium). Each analog representation of the digital signal is then combined with a carrier signal and transmitted to the receiving end of the apparatus where the carrier signal is stripped off and the original analog signal transmitted is transformed into the original parallel digital data bit pattern transmitted.

16 Claims, 8 Drawing Sheets

PARALLEL DIGITAL DATA COMMUNICATIONS

BACKGROUND OF THE INVENTION

Current digital data transmission techniques involve transmitting one bit of data per unit time. This is the common technique used for transmitting digital information whether the media be hard wire connection (copper), optical fiber (fiber), or radio frequency (RF).

Although computers communicate serially, they typically operate in a parallel data mode. 8-bits, 16-bits and 32-bits are the most common parallel bused systems. In these systems all parallel data lines change states synchronously per unit time. Parallel connections are by far the fastest mode of communications. However, they require physical connections for all the lines. The physical length of the connections are limited as well as the speed of data transfer because of cross talk on the lines, impedance of the wires, and susceptibility to outside RFI/EMI interference. Consequently, the internal parallel buses of a computer are very short. The external connections on parallel buses are also short—typically less than 10 feet. Serial connection on the other hand can be quite lengthy—100s of feet, (enhanced systems such as those used by phone companies can be 100's miles long) partly because there is significantly less interference due to cross talk and the cable being shielded.

There are two types of serial communications—synchronous and asynchronous. In asynchronous serial communications the computer transfers data to a device having an n-bit storage register. This device also has an external clock that is used to synchronize the data transmission between the computer and the transmitting device. The transmitting device shifts one data bit, the least significant bit, onto a single output line, counts a specified number of clock pulses, shifts the next bit on the transmitting line, counts the specified number of clock pulses, and continues until all n data bits are transmitted. The transmitting device then indicates to the computer it is ready to transmit another n-bit byte. The cycle continues until all data is transmitted.

At the receiving end, when the receiver senses that it is receiving data it counts half of the specified number of clock pulses, then samples the data again—if the state has not changed the receiver assumes it is receiving a data byte and the first data bit is shifted into an n-bit shift register. The receiving device then counts the specified number of clock pulses and shifts whatever is on the receiving line into the shift register. The first bit received is shifted one bit position. This continues until all bits of the word are received.

At this time the receiving computer is notified that data can be received. There are start and stop bits that help the receiver determine that data is being received properly, and there are numerous forms of software flow control bytes in the data. In short length serial lines, typically less than 25 feet, there may also be additional hardware control lines used to determine when data should be transmitted.

In synchronous serial communications, one computer or the other generates the clock signal and this signal is transmitted over a physical connection between the two devices. This allows for higher speeds as the receiver can store bits on every clock pulse as opposed to sampling at what is assumed to be the middle of each transmitted bit (this is why the first bit is stored on half of the clock pulses and every bit there after at the specified number of clock pulses as previously explained).

The transmission of parallel based computer generated information via copper, fiber, or RF from one location to another requires that the parallel data be converted to a serial format prior to transmission. Over the years the transmission speeds have increased significantly in order to transmit serial data at higher data rates.

There is a need for an enhanced method of digital data transmission that would increase the speed of parallel data transmitted without being transformed into a serial mode. Such a parallel transmission method would significantly increase data transmission rates, allow for more users on a network (or callers on a phone system using the same time-division multiplexed protocols currently in use), and provide for new communications system developments to accommodate increased usage.

In addition to serial and parallel mode communications, dual tone multiple frequency mode (DTMF) communications are also being used. One use of DTMF is for generating digital tones on phone sets. This system allows the phone system to determine which of the twelve keys on a phone key pad has been pressed. DTMF assigns a unique frequency to each row and column on a telephone keypad. When a key is pressed the associated row and column frequencies are mixed and transmitted over the telephone wire. The receiving end, through the use of filters determines which of the frequencies were originally transmitted and thus determines which key was originally pressed.

There is also wireless data communication that uses conventional techniques. Typically in wireless data communication a carrier frequency is used to carry the data in a manner similar to that used by AM and FM radio transmissions. A local oscillator at the transmitter generates the signal that is transmitted from the antenna. The signal, typically voice, is beat or mixed or modulated with the local oscillator signal. The voice signal is at a much lower frequency than that of the local oscillator signal. At the receiver end a receiving local oscillator is tuned to exactly the same frequency as that of the transmitting local oscillator signal, but the signal generated is 180 degrees out of phase. The mixed signal transmitted is mixed with the receiving local oscillator signal causing the mixed signal transmitted to be stripped of the transmitting local oscillator signal. The remaining signal represents that which was originally mixed with the transmitter local oscillator signal. This signal is amplified and sent to a speaker.

This type of radio frequency transmission method can used to transmit computer data. Because the local oscillator signal is a single frequency, data can be transmitted in a manner considered serial. This is because the data is mixed with the local oscillator signal and transmitted in the same method as explained in the serial discussions above. One bit at a time is mixed with the local oscillator signal for a given period of time. Data is received and reconstructed as described above.

It is the object of the present invention to enhance computer data transmission time by providing a device that transfers and reconstructs an n-bit digital data word in a period of time equal to that used to transmit one data bit in parallel to serial communications.

SUMMARY

A digital data transmission system for transmitting parallel digital data bit patterns over a single line. More particularly the system provides a look-up means for determining an identifier to be associated with each of the digital data bit patterns to be transmitted. A conversion means that is operatively connected to the look-up means converts the parallel digital data patterns into an analog signal having the identifier assigned by the look-up means. A first mixing means is operatively connected to the conversion means for combining the analog signal and a first carrier signal. The combined signal is transmitted by a transmitter means to the receiving end of the apparatus that has a receiving means that is operatively connected to the transmitter means for receiving the combined analog and first carrier signal. The second mixing means is operatively connected to the receiving means and is used for stripping off the first carrier signal from the combined signal. A decoding means is operatively connected to the second mixing means for decoding the analog signal to yield the original parallel digital data pattern transmitted.

GENERAL DESCRIPTION

The present invention relates to transmission of parallel digital data over a single line by way of a encoding the parallel bit pattern and transmitting the encoded pattern over the single line (i.e., copper, fiber, or radio frequency). The parallel digital data bit pattern is transferred and reconstructed in one period of time, the same period of time being used to transmit one data bit in parallel to serial communications. This significantly increases parallel transmission rates over the single line.

The present invention typically functions on an 8-bit computer having 256 8-bit binary combinations. A unique frequency is assigned to each of the 256 different 8-bit patterns. A digital representation for the assigned frequency is transmitted from a digital data synthesizer to a digital to analog converter which generates a pure sine wave. The pure sine wave is combined with a carrier signal and transmitted using conventional techniques. The receiving end strips off the carrier signal by mixing the signal received with a receiving signal that is tuned to exactly the same frequency as the carrier signal but 180 degrees out of phase. Whatever signal remains represents the analog signal originally combined with the carrier signal. A decoding means transforms the remaining signal to the bit pattern originally transmitted.

In the preferred embodiment, the decoding means is performed by a series of band pass filters that match up to determine the remaining signals frequency. This frequency is used to identify the bit pattern originally transmitted.

In another embodiment, a dual tone multiple frequency communication method is used. As described in the background of the invention, this method has been used for generating tones on phone sets. The present invention utilizes the same concept by breaking up an 8-bit digital character into two hex bytes. Each hex byte (total of 16 possible bit patterns) would be assigned a unique frequency, with the upper bytes being assigned frequencies several times greater than the lower bytes. The two frequencies would be combined together and mixed with a carrier signal. At the receiving end the carrier signal would be striped and 32 narrow band filters would decode the two frequencies for identifying the two hex bytes originally transmitted. The two hex bytes would be combined and the 8-bit pattern originally transmitted would be output. All this would occur at the same rate as serial bit transmission meaning that, at a minimum, data rates would be increased by a factor of eight (more if start bits, stop bits, parity, or other control bits are also part of the transmission).

Another method of filtering would be through the use of a surface acoustic wave device (SAW) which executes billions of operations per second and performs filtering operations in near real time. The SAW would take the incoming analog signal and provide a digital output indicating which bit pattern was originally transmitted. The resulting 8 bit pattern would be transferred to the receiving computer in a parallel manner.

Although these frequency techniques are the preferred method, the coding of the original 8-bit patterns could also be accomplished using phase modulation or amplitude modulation.

DETAILED DESCRIPTION OF THE PREFERRED EMBODIMENT

Figure 1A:
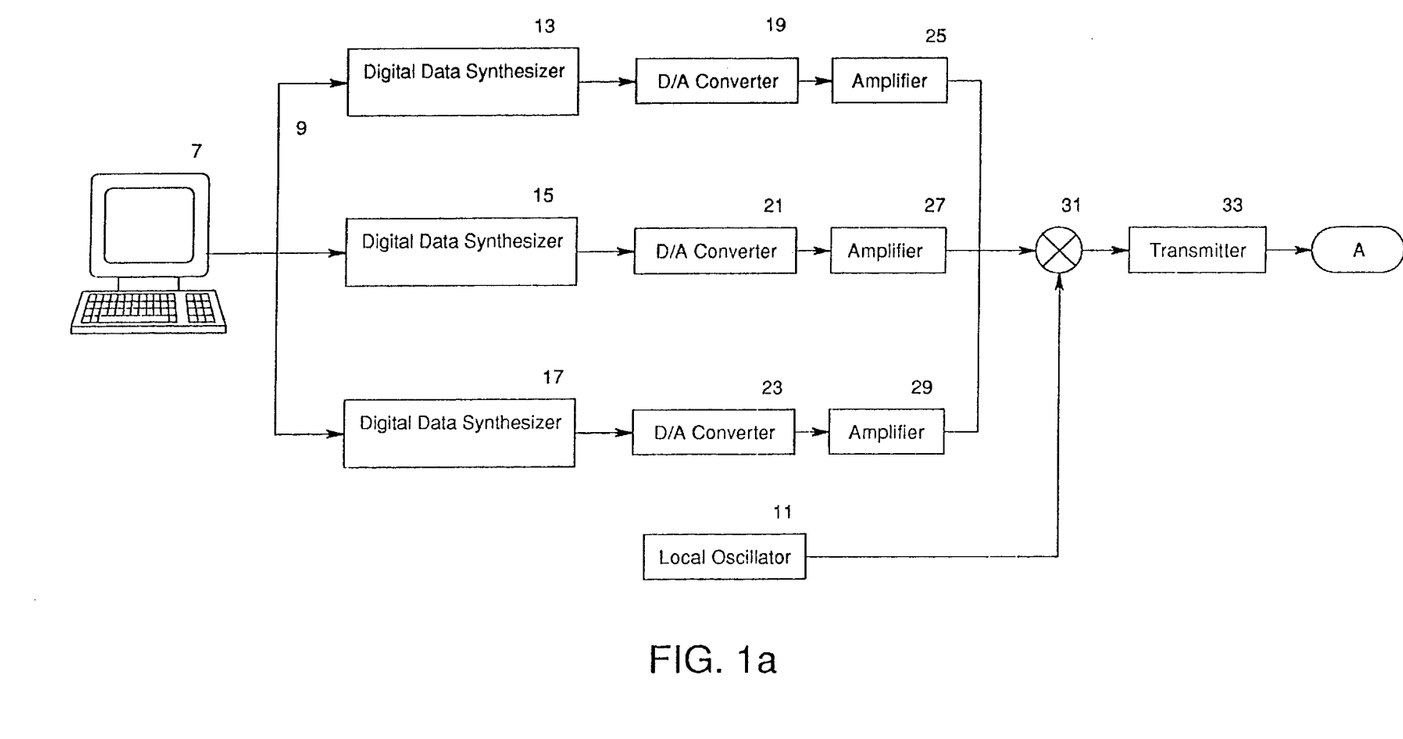
FIG. 1a is a functional block diagram of the transmitting end of a the preferred radio frequency embodiment of the present invention.

The preferred embodiment of the present invention utilizes the dual tone multiple frequency communication method. As shown in FIG. 1a, the transmission side of the preferred embodiment includes a local oscillator (11), three digital data synthesizers (13, 15, 17), three digital to analog converters (19, 21, 23), three amplifiers (25, 27, 29), a mixer (31), and a transmitter (33). The digital data synthesizers are selected based on the maximum frequency to be synthesized. The digital to analog convertors are selected to match the frequency output resolution desired. The amplifiers are selected and designed based on the amplification required for the transmission media; this would vary depending on whether copper, fiber, or RF is the transmission media. The mixer (31) is used to combine the output of the three amplifiers (25, 27, 29) with a carrier signal generated by the local oscillator (11). The output of the mixer (31) is input to the appropriate transmitter for the media used; i.e., local oscillator mixer for radio frequency, level translators for copper, or LED transmitters for fiber.

Functioning of the preferred embodiment, shown in FIG. 1a, begins when a computer (9) receives an eight bit byte for parallel transmission. The digital data synthesizers (13, 15, 17) are connected to the computer (7) by a bus (9) consisting of address, data and control lines. Two of the digital data synthesizers (13, 15) are used to control two of the digital to analog convertors (19, 21) that generate the analog signals. The analog signals have frequencies that define the upper and lower 4 bits of the 8-bit byte being transmitted. A look-up table determines what frequency is associated with the upper or lower four bits of the eight bit byte. The computer (9) then writes to the control registers of the first and second digital data synthesizers (13, 15) the frequencies assigned to the eight bit byte. A control word is then transmitted from the digital data synthesizers (13, 15) to the first and second digital to analog convertors (19, 21) for assigning those frequencies to the analog signals generated by the digital to analog convertors (19, 21).

The first digital data synthesizer (13) provides a means for the assignment of sixteen different frequencies to the lower four bits of the eight bit byte being transmitted. The second digital data synthesizer (15) provides a means for the assignment of sixteen different frequencies to the upper four bits of the eight bit byte being transmitted. In a four bit byte, there are sixteen possible digital representations. Each of those 4-bit bytes is assigned a frequency. These frequencies are controlled and defined by the look-up table. The third digital data synthesizer (17) is used to generate a signal having a fixed frequency that is about five times greater than the maximum of the thirty-two frequencies assigned to the first and second digital data synthesizers (13, 15). This signal is used as the clock.

The first and second digital data synthesizers (13, 15) control the signal output from the digital to analog convertors (19, 21) through the transmission of digital signals that represent the frequencies assigned to the upper and lower four bits of the 8-bit byte. The digital to analog convertors (19, 21, 23) transforms each digital signal transmitted and generates a sign wave. The sine waves are input into three amplifiers (25, 27, 29) to provide signal gain and smoothing. The output of the three amplifiers (25, 27, 29) are combined with a carrier signal generated from a local oscillator (11) by a first mixer (31). This combined signal is sent to a transmitter (33) for transmission to the receiving end of this apparatus illustrated in FIGS. 1b–1c.

For illustration purposes, 1 MHz is assigned as the lowest frequency and 16 MHz as the highest frequency at 500 KHz spacing for the thirty-two different frequencies defined in the look-up table for the analog signals generated by the digital data synthesizers.

Following generation of an analog signal having the appropriate frequency, the computer (7) delays for ten Micro seconds, a period of time equal to approximately ten cycles of 1 MHz, the lowest frequency. This delay gives the filters on the receiver side time to settle. After the delay, the third digital data synthesizer (17) is enabled. The third digital data synthesizer (17) provides a means for generating a clock pulse to tell the receiver when to latch the received data. For illustration purposes, a clock frequency of 50 MHz is selected. The third digital data synthesizer (17) is enabled for 5 cycles or 0.1 micro seconds and then disabled by the computer (7). This process is repeated for every byte that needs to be transmitted.

Figure 1B:
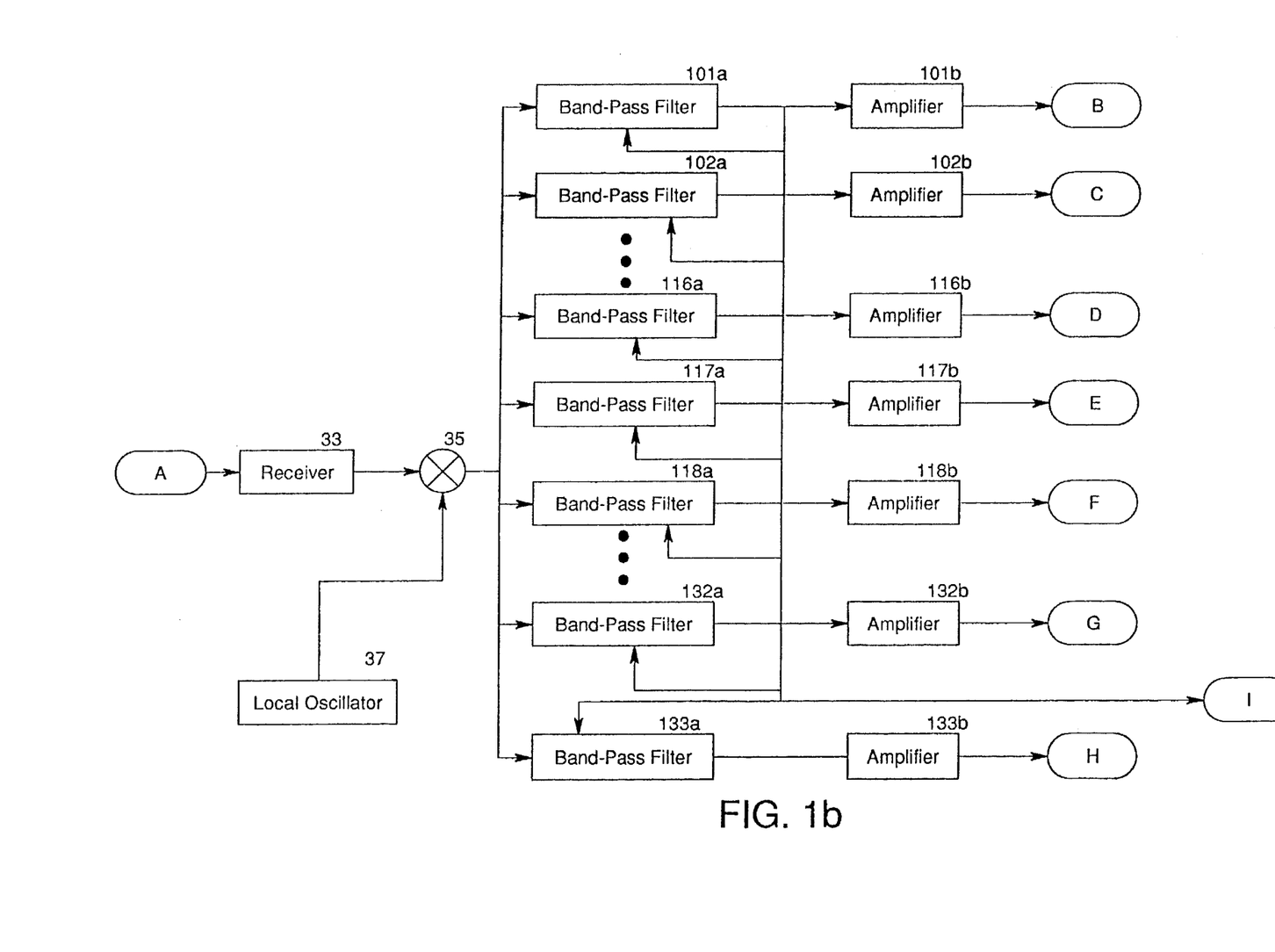
FIGS. 1b–1c are functional block diagrams of the receiving end of the preferred radio frequency embodiment of the present invention.
Figure 1C:
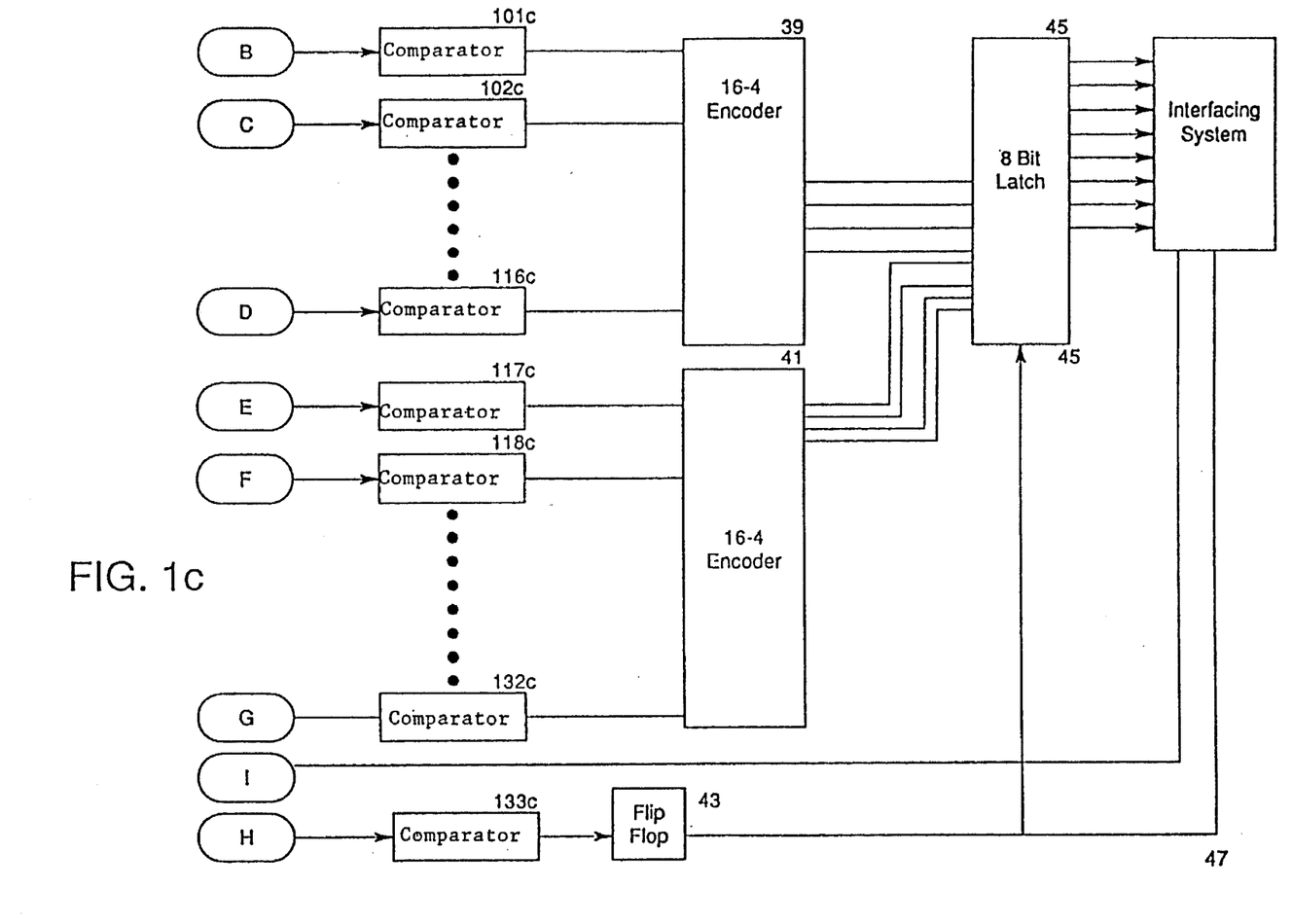

The receiver side, shown in FIGS. 1b–1c, includes a receiver (33), a second mixer (35), a second local oscillator (37), thirty-three band-pass filters (101–133), thirty-three amplifiers (201–233), thirty-three comparators (301–333), two encoders (39, 41), a flip flop (43) and an eight-bit latch (45).

The signal transmitted is input into the receiver (33) from the first mixer (31). The receiver (33) transmits the combined signal to a second mixer (35) where the signal is mixed with a strip signal generated by the second local oscillator (37). The strip signal is tuned to exactly the same frequency as that of the carrier signal generated by the transmitting local oscillator (11). However, the strip signal is 180 degrees out of phase with the carrier signal, causing the carrier signal to be striped from the combined signal transmitted. The remaining signal is the analog signal originally combined with the carrier signal and the clock pulse. The analog signal is then transmitted into thirty different band-pass filters (101–132) and the clock signal is transmitted into band-pass filter (133). Each of the thirty band-pass filters (101–132) and the clock band-pass filter (133) will have been pre-programmed by the receiving computer to provide band-pass filtering for the 32 frequencies programmed at the transmit side and for the clock frequency.

When data is being received, only one of the low side filters (101–116) will have an output and only one of the high side filters (117–132) will have an output. This output will correspond to the two transmitted frequencies assigned to the upper and lower 4-bits of the 8-bit byte transmitted. The output of each filter will then be passed to an amplifier (101b–132b) to boost the gain and then to a comparator (101c–132c). The comparators (101c–132c) will be set to toggle the output only if there is a signal present. The output lines of the comparators (101c–132c) are connected to two 16-4 line encoders (39, 41). These encoders (39, 41) encode the 16 inputs from the comparators into 4-bit patterns. Each 4-bit pattern corresponds to the original lower or upper 4-bits of the original 8-bit byte transmitted. The outputs from the encoders (39, 41) are combined by an 8-bit latch (43) to form the 8-bit byte originally transmitted.

The clock signal passes through the clock filter (133), clock amplifier (233) and a comparator (333) in the same manner described above. When the clock signal is detected a flip-flop (45) will toggle and latch the received data. The clock signal (47) will also inform the receiving computer that an 8-bit byte has been received. This process continues with data being transferred each time the transmission clock pulses.

Figure 2A:
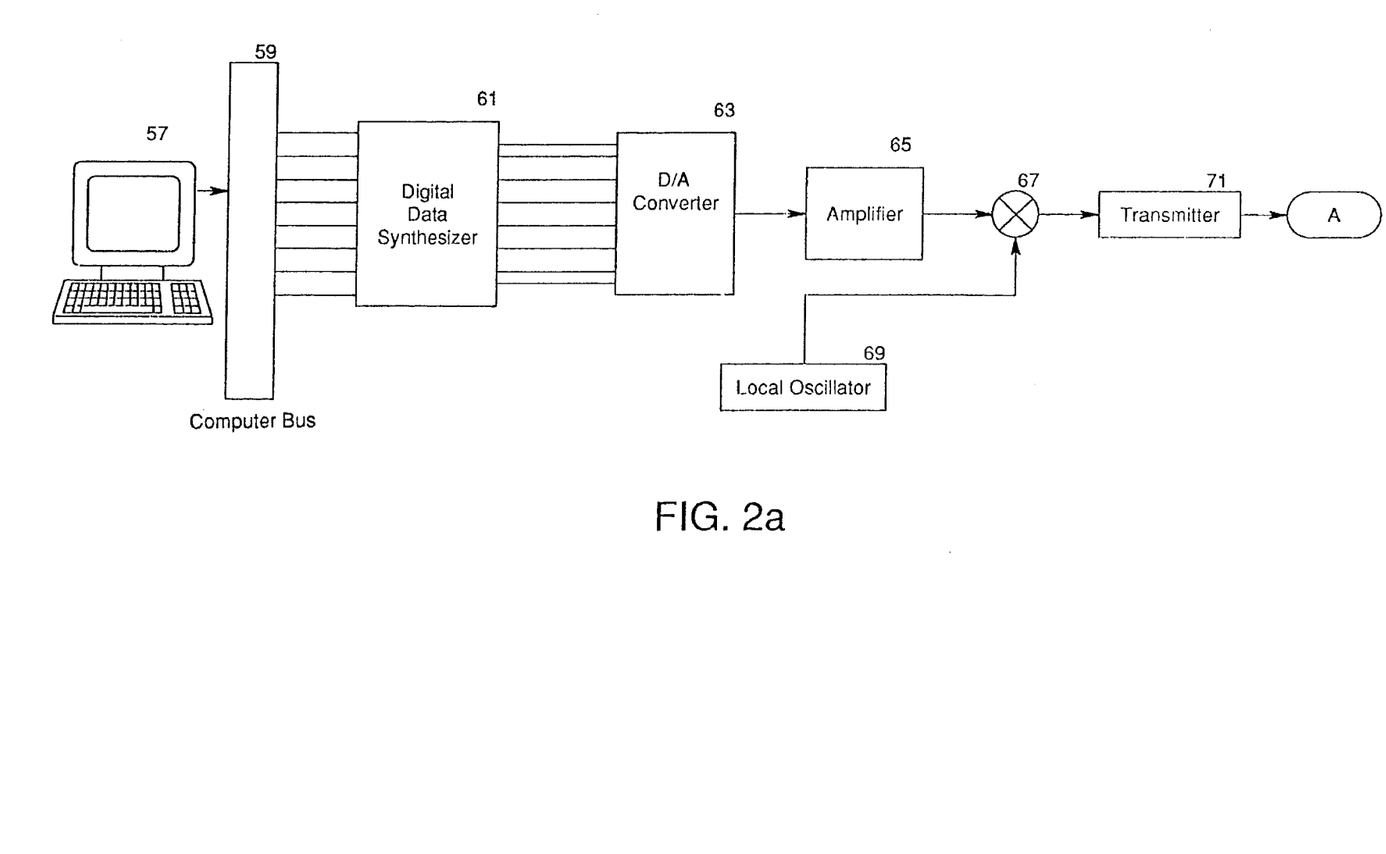
FIG. 2a is a functional block diagram of a second radio frequency embodiment of the present invention.
Figure 2B:
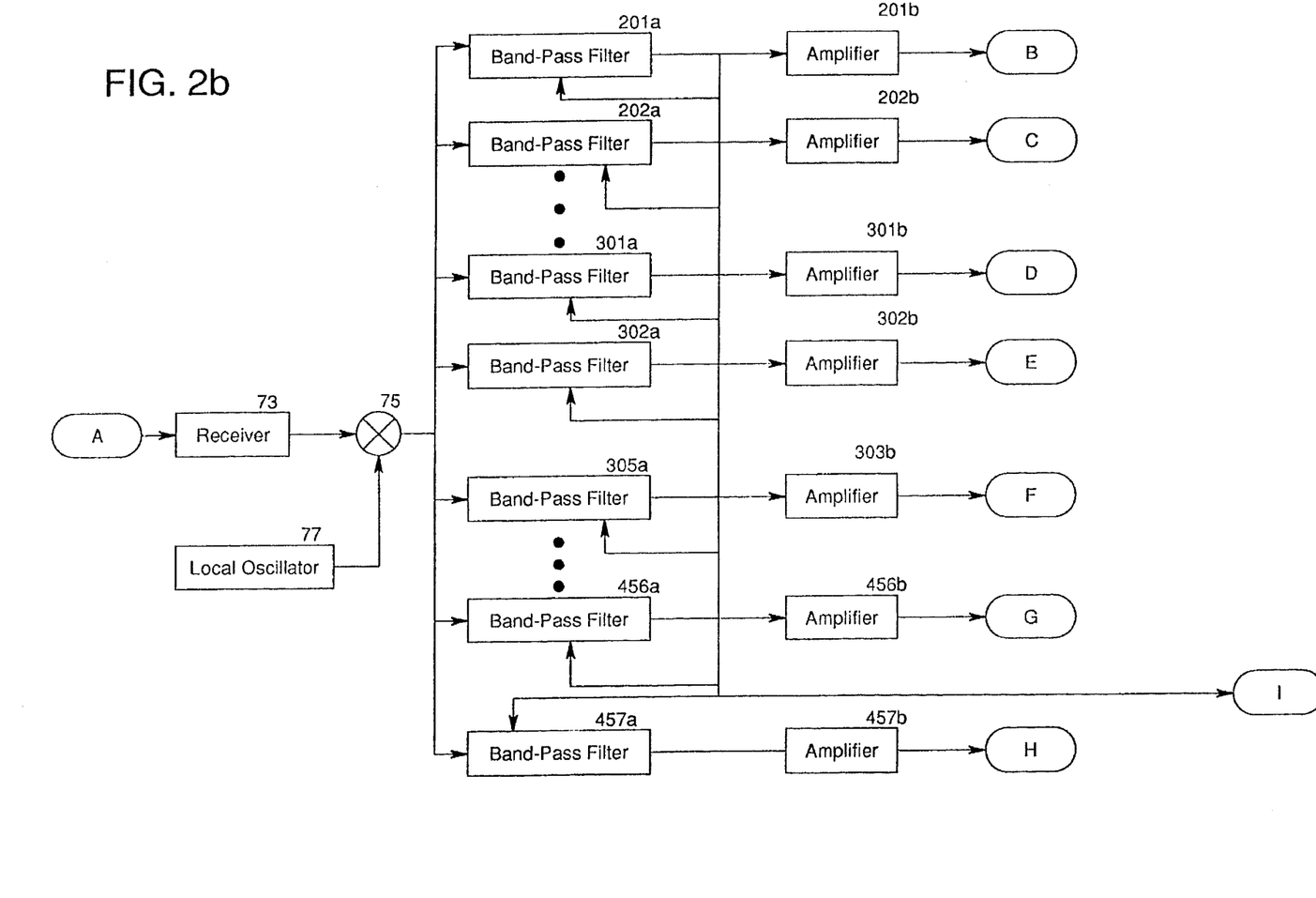
FIGS. 2b–2c are functional block diagrams of the receiving end of a second radio frequency embodiment of the present invention.
Figure 2C:
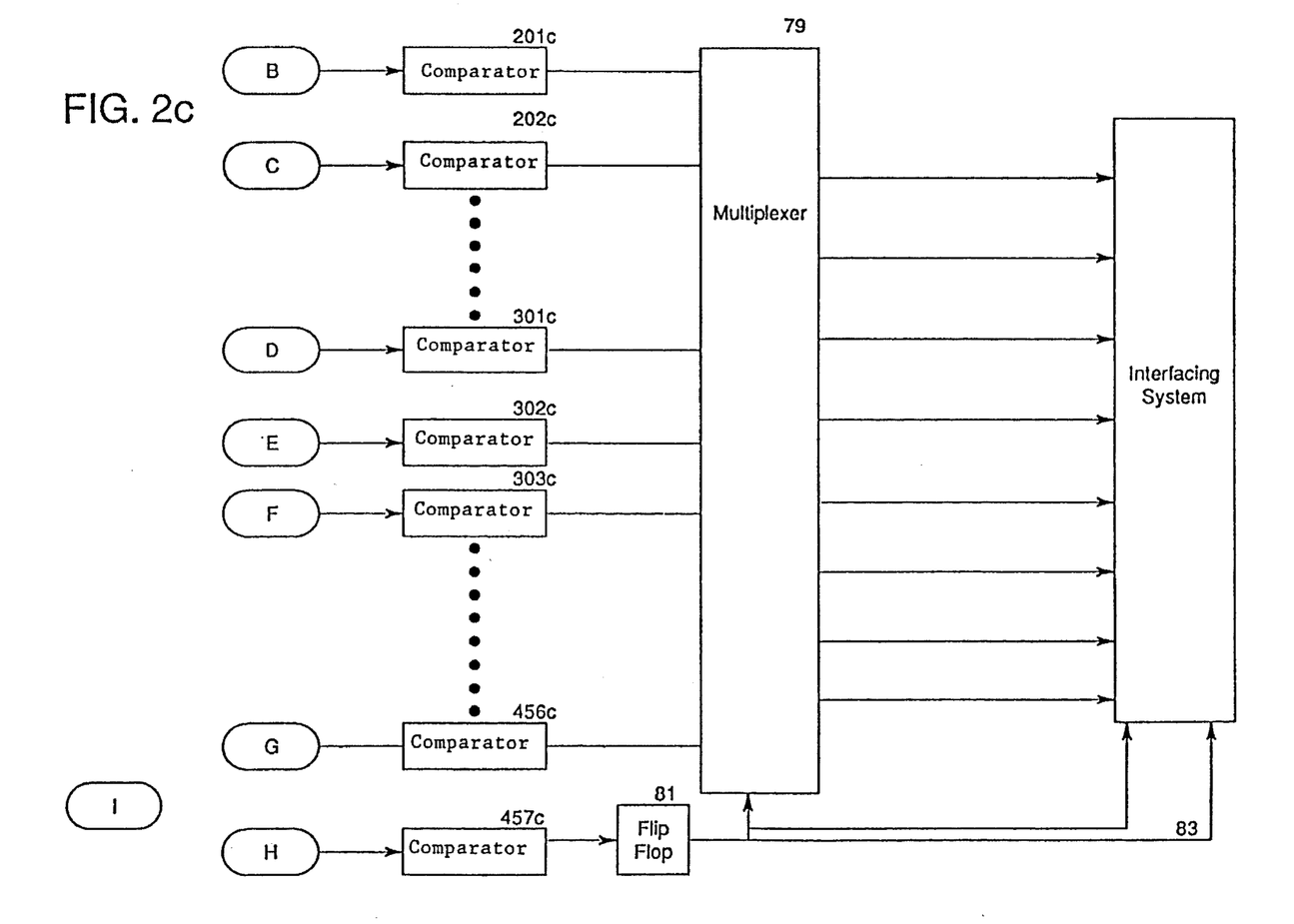

In another embodiment, shown in FIGS. 2a–2c, in the same manner as described above in the preferred embodiment, 256 frequencies are generated, instead of thirty-two. The 256 frequencies are assigned to the 256 possible bit combinations in an 8-bit byte. The transmitting computer (57) looks up the frequency associated with each 8-bit pattern in a look-up table and then writes to the control registers of the digital data synthesizers (61) appropriate frequencies. A control word is then transmitted from the digital data synthesizers (61) to the digital to analog convertors (63) for assigning those frequencies to the analog signals generated by the digital to analog convertors (63). The analog signals generated are amplified (65) and mixed (67) with a carrier signal generated by a local oscillator (69) and transmitted (71) to a receiver (73).

The receiving end strips out the carrier signal as described above by mixing (75) the signal received with a strip signal generated by a receiving local oscillator (77). This strip signal is tuned to exactly the same frequency as that of the carrier signal, but is 180 degrees out of phase. Because the receiving local oscillator signal is 180 degrees out of phase the mixed signal transmitted is stripped of the transmitting local oscillator signal. The remaining signal represents the original analog signal.

In this embodiment, there are 256 individual narrow band filters (210a–456a) used to filter the analog signals instead of 32 as described in the preferred embodiment. These 256 narrow band filters are used to identify which frequency was originally transmitted. Because the filters are very narrow band, only one filter will have an output. The output of each filter is amplified (210b–456b) and passed to a comparator (201c–456c) that acts as a detector. There is also a clock signal that passes through a narrow band filter (457), amplifier (457b) and comparator (457c) that is used to set a flip-flop (81). By way of a multiplexer (look-up table could also be used) the signals output from the comparators (201c–456c) are transformed into the original 8-bit byte that was transmitted.

Through the use of the technique disclosed in the preferred embodiment, it is possible to reduce the total number of frequencies used to represent the 256 possible patterns available with 8 bits to 32 frequencies by mixing frequency assigned to the lower HEX pattern with frequency assigned to the upper HEX pattern. Thus the two frequencies, upper HEX 4 bit pattern and lower HEX 4 bit pattern are mixed prior to being mixed with the carrier signal for transmission.

Figure 3A:
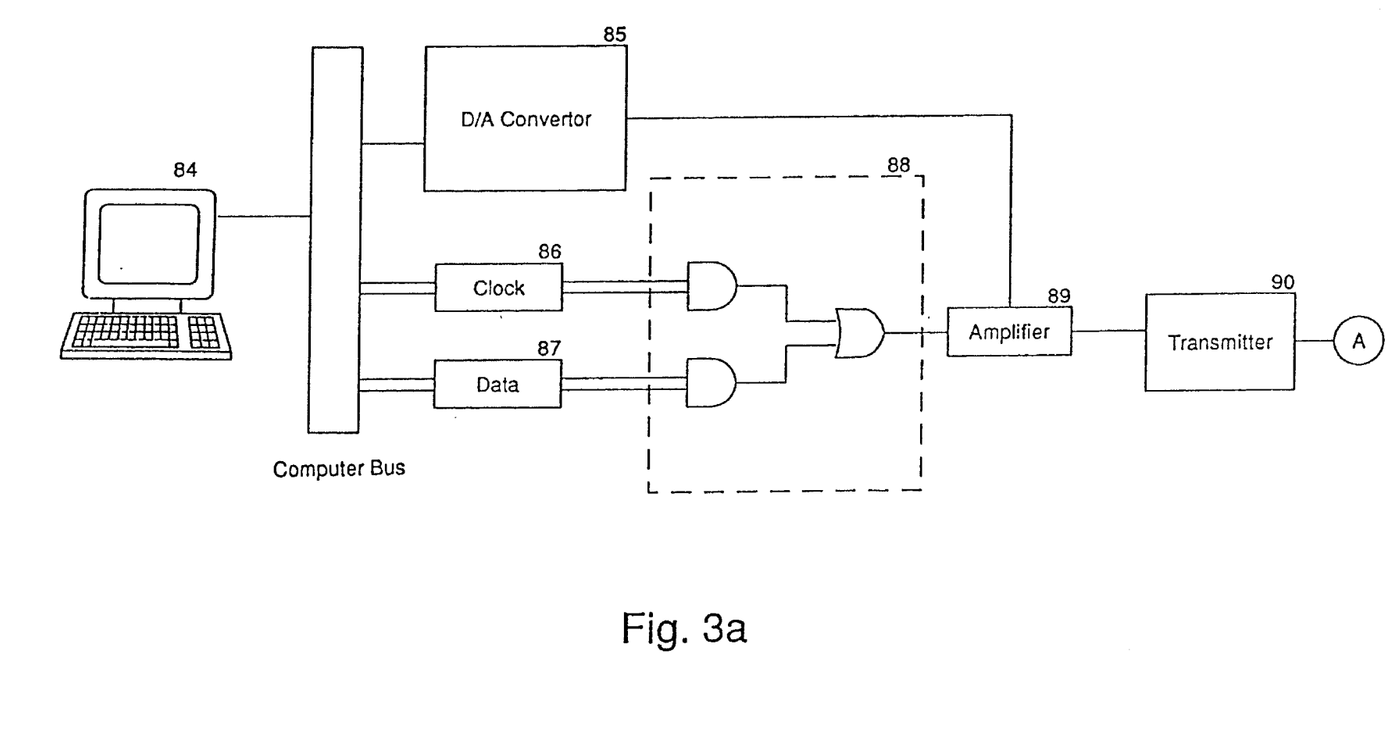
FIG. 3a is a functional block diagram of the transmitting end of an amplitude modulation embodiment of the present invention.
Figure 3B:
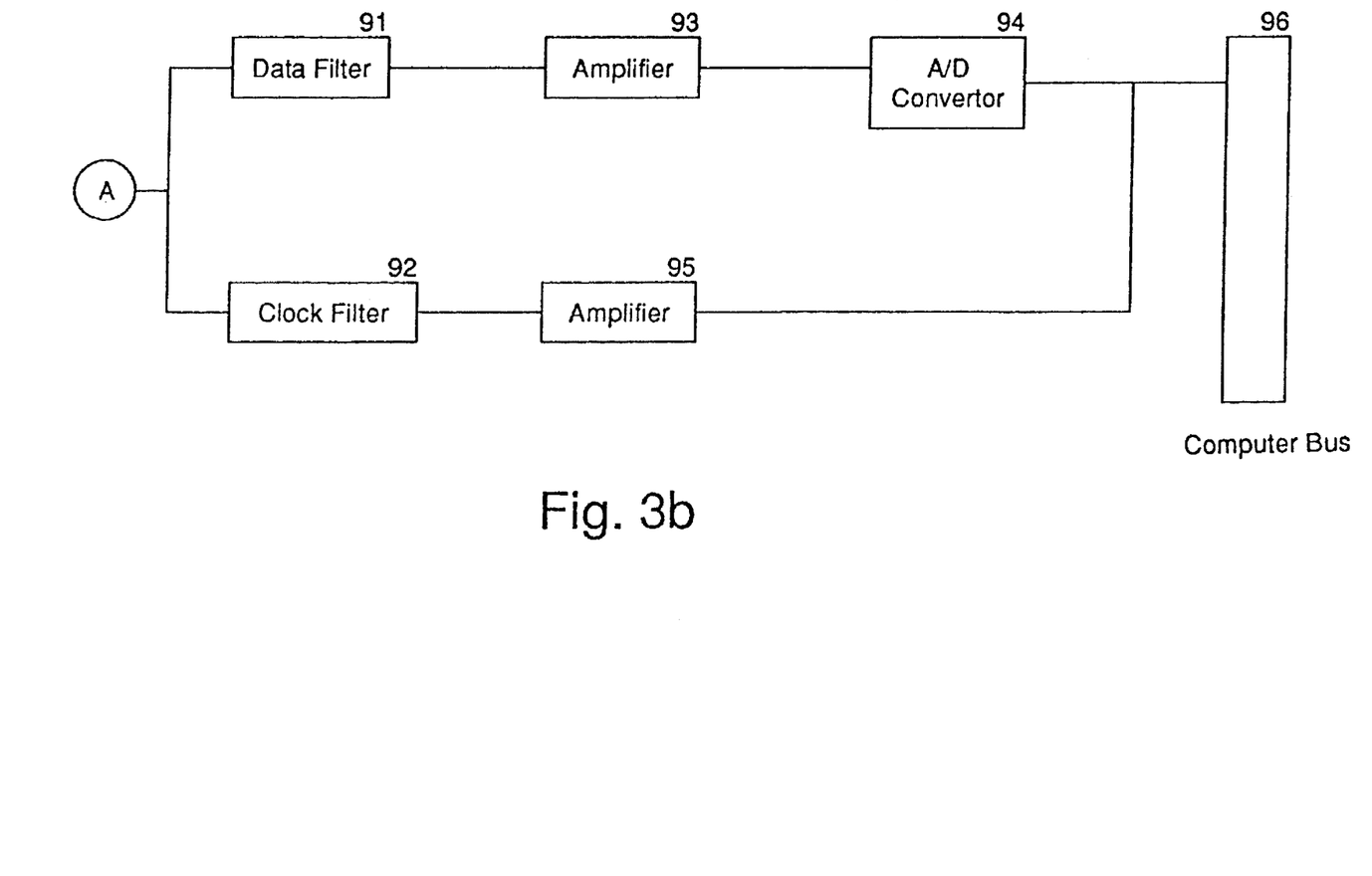
FIG. 3b is a functional block diagram of the receiving end of an amplitude modulation method of the present invention.

The same technique, transmitting parallel data in a serial mode, could be implemented using amplitude and phase modulation principles. An embodiment using the amplitude modulation technique is shown in FIGS. 3a–3b. Generally, for an amplitude modulation method of transmitting parallel digital data, a single frequency could be used as the signal mixed with the local oscillator, the only difference would be the amplitude of the signal in which the amplitude represented the original 8-bit byte. The receiver could have level detectors to determine which 8-bit patterns were originally transmitted.

The embodiment shown in FIGS. 3a–3b utilizes, a constant frequency to represent the data signal and a different constant frequency to represent the clock signal and provide the required synchronization. The value of the data is represented by the amplitude of the frequency. The exact amplitude of the analog signal generated by the digital analog convertor (85) corresponds to the value of the encoded data. As shown in FIG. 3a, the transmitting computer 84 would control a 50% duty cycle gating switch 85 for the two oscillators (86, 87) thus cycling the output between the clock frequency and the data frequency.

If a 0 to 5 volt value is used to represent the data signal value and if an 8-bit data pattern is to be encoded, then there would be 256 different voltage values assigned to the 256 different possible bit combinations of the 8-bit data of approximately 0.019 volts each. These individual voltages would control an output amplifier (89) that would in turn control the power output of the amplifier (89) and consequently the amplitude of output amplifier (89). The amplified signal would be input into a transmission medium 90. If radio frequency is the transmission medium a local oscillator and mixer would be used in conjunction with a transmitter. If fiber optics is used, the amplifiers transmitting and receiver LEDs would be used in conjunction with a transmitter.

Two narrow band filters (91, 92) would be used at the receiving end shown in FIG. 3b for the clock and data signals respectively. The filtered clock signal would signal to the receiving computer through the bus (96) that a clock pulse had been received and that, after the clock signal had transitioned, the data should be sampled. A charge coupled amplifier (93) would provide input to an analog to digital convertor (94), which would be sampled to determine the amplitude of the data signal. The analog to digital convertor value would correspond to one of the 256 original values used to generate the amplitude of the original data signal. If the length of the transmission cable is short, for example 10 feet, then the data could be transmitted, received, and decoded relatively error free. These circuits could be constructed using commonly available commercial parts.

In most situations, there would be some noise introduced by the transmitting electronics and in the transmitting media (copper, fiber or RF). To allow for noise in the system, to enhance the recoverability of the transmitted data, and to significantly reduce the potential for error the clock signal is amplitude controlled (95). In addition, the clock signal is used to indicate to the receiver what value range to use in determining the data value associated with the amplitude of the data signal.

For example, if a 0 to 5 volt signal is used to encode the data, the amplitude of the clock signal is divided into 5 different values (1, 2, 3, 4, and 5). A digital to analog convertor will be used on the transmitter side to generate the 5 different voltage levels that control the amplitude amplifier for the clock pulse. The 256 different data patterns of the 8-bit value to be transmitted will be divided into groups of 5. Each group will be associated with one of the five values assigned to the clock pulse as shown below in Table 1.

TABLE 1

| CLOCK VALUE DATA BIT GROUPINGS | |
|---|---|
| CLOCK VALUE | DATA BIT GROUPS |
| 1 | 0–50 |
| 2 | 51–102 |
| 3 | 103–154 |
| 4 | 155–206 |
| 5 | 207–255 |

This means that the 0 to 5 volt range for the data signal can now be divided into 51 different voltage values for five groups as opposed to 256 different voltage values for one group; this is approximately 0.1 volt for 51 different values versus 0.019 volts for 256 different values.

The receiver would sample the clock signal when received and determine the amplitude. The value (1, 2, 3, 4, or 5) would be used to indicate to the receiving computer which of 5 look-up tables to use for the data signal. When the clock signal has transitioned, the receiving computer will sample the data signal and determine the value of the amplitude. This value will be assigned the appropriate 8-bit value based on the look-up table.

By using the clock signal to partially encode the value of the data the receiver can allow for 20 to 40 mili-volts of error that may be introduced by the transmitting media. This would make the transmitting method virtually error free due to noise.

If a phase modulation technique was used, each parallel bit pattern would be assigned a unique phase angle. The associated phase angle signal would be mixed with a reference signal of different frequency and then mixed with the carrier. The receiver would strip the carrier signal resulting in the reference signal and the data signal. The phase angle difference would determine the original bit pattern transmitted.

In addition to transmitting data in this manner in a wireless medium, the same technique can be used to transmit data over optical fiber cable.

What is claimed:

1. A digital data transmission system for transmitting parallel digital data bit patterns over a single line, comprising:

a look-up table for associating a unique frequency with the parallel digital data bit pattern;

a digital data synthesizer driven by said look-up table for generating a digital representation of said frequency;

a digital to analog convertor operatively connected to said digital data synthesizer for generating said frequency from said digital representation;

a first mixer operatively connected to said digital to analog convertor for mixing said frequency and a carrier signal;

a transmitter operatively connected to said first mixer;

a receiver operatively connected to said transmitter;

a second mixer operatively connected to said receiver and a local signal 180 degrees out of phase with said carrier signal thereby removing said carrier signal and recovering said frequency; and decoder means operatively connected to said second mixer for identifying and transforming said frequency into the digital data bit patterns transmitted.

2. The digital data transmission system of claim 1 wherein said decoder means comprises:

a plurality of filters operatively connected to said mixer;

a plurality of amplifiers operatively connected to said filters;

a plurality of comparators operatively connected to said amplifiers;

a plurality of encoders operatively connected to said comparators; and a latch operatively connected to said encoders for generating the bit pattern transmitted.

3. The digital data transmission system of claim 1 wherein said decoder means comprises a surface acoustic wave device.

4. The digital data transmission system of claim 2 wherein said plurality of filters identify said frequency.

5. The digital data transmission system of claim 1 wherein said plurality of amplifiers boost said frequency.

6. An apparatus for transmitting parallel digital data bit patterns over a single line, comprising:

look-up means for determining a digital representation for each digital data bit pattern;

conversion means operatively connected to said look-up means for converting the digital representations to a unique frequency;

first mixing means operatively connected to said conversion means for combining said unique frequency and a carrier signal;

transmitter means operatively connected to said mixing means for transmitting said combined unique frequency and carrier signal;

receiving means operatively connected to said transmitter means for receiving said combined unique frequency and carrier signal;

second mixing means operatively connected to said receiving means and a local signal 180 degrees out of phase with said first carrier signal for stripping off said first carrier signal from said combined unique frequency and first carrier signal; and decoding means operatively connected to said second mixing means for decoding said unique frequency signal to the parallel digital data bit patterns transmitted.

7. The apparatus for transmitting parallel digital data bit patterns of claim 6 wherein said conversion means comprises:

at least one digital data synthesizer operatively connected to said look-up means; and at least one digital to analog convertor operatively connected to said digital data synthesizer.

8. The apparatus for transmitting parallel digital data bit patterns of claim 6 wherein said decoding means comprises:

a plurality of filters operatively connected to said mixer;

a plurality of amplifiers operatively connected to said filters;

a plurality of comparators operatively connected to said amplifiers;

a plurality of encoders operatively connected to said comparators;

a latch operatively connected to said encoders for generating the bit pattern transmitted.

9. A method of transmitting parallel digital data bit patterns over a single line, comprising the steps of:

assigning a digital representation to each of the parallel digital data bit patterns;

converting the digital representations to a unique frequency;

mixing said unique frequency and a carrier signal, thereby forming a mixed signal;

transmitting said mixed signal to a receiver, said receiver receiving said mixed signal;

removing said carrier signal from said mixed signal resulting in said unique frequency;

transforming said unique frequency of the removing step to the parallel digital data bit patterns transmitted.

10. A digital data transmission system for transmitting a parallel digital data bit pattern consisting of a first bit group of n bits and a second bit group of m bits over a single line, comprising:

(a) look up means for assigning a first frequency from a first frequency group of $2^n$ frequencies to the first bit group and a second frequency from a second frequency group of $2^m$ frequencies to the second bit group, said look up means generating digital representations of said first frequency and said second frequency, said first frequency group being completely disjoint from said second frequency group;

(b) conversion means operatively connected to said look up means for converting the digital representations of said first frequency and said second frequency to said first frequency and said second frequency;

(c) first mixing means operatively connected to said conversion means for combining said first frequency and said second frequency and a carrier signal thereby producing a combined signal;

(d) transmitter means operatively connected to said mixing means for transmitting said combined signal;

(e) receiving means operatively connected to said transmitter means for receiving said combined signal;

(f) second mixing means operatively connected to said receiving means and a local signal 180 degrees out of phase with said carrier signal for stripping off said carrier signal from said combined signal thereby recovering said first frequency and said second frequency; and (g) decoding means operatively connected to said second mixing means for decoding said first frequency and said second frequency to said first bit group and said second bit group and combining said first bit group and said second bit group into the parallel digital data pattern.

11. The digital data transmission system of claim 10, wherein the parallel digital data bit pattern comprises eight bits and said first bit group and said second bit group each comprise four bits of said parallel digital data bit pattern.

12. The digital data transmission system of claim 10, wherein said conversion means comprises:

a first digital data synthesizer operatively connected to said look up means for generating a digital representation of said first frequency and a second digital data synthesizer operatively connected to said look up means for generating a digital representation of said second frequency; and at least one digital to analog convertor operatively connected to said first digital data synthesizer and said second digital data synthesizer.

13. The digital data transmission system of claim 10, wherein said decoding means comprises:

a plurality of filters operatively connected to said mixer;

a plurality of amplifiers operatively connected to said filters;

a plurality of comparators operatively connected to said amplifiers;

a plurality of encoders operatively connected to said comparators; and a latch operatively connected to said encoders for generating the bit pattern transmitted.

14. A digital data transmission system for transmitting a parallel digital data bit pattern over a single line, comprising:

a digital to analog converter generating a data frequency amplitude-modulated by the parallel digital data bit pattern;

an oscillator generating a clock frequency;

an amplifier operatively connected to said digital to analog convertor and said oscillator, said amplifier amplifying the data frequency and the clock frequency;

a transmitter operatively connected to said amplifier;

a receiver operatively connected to said transmitter;

a data filter operatively connected to said receiver, said data filter being responsive to said data frequency;

a clock filter operatively connected to said receiver, said clock filter being responsive to said clock frequency;

a data amplifier operatively connected to said data filter; and an analog to digital convertor operatively connected to said data amplifier, said analog to digital convertor converting the amplitude of said data frequency to the parallel digital data bit pattern.

15. The digital data transmission system of claim 14, wherein each value of the parallel digital data pattern causes said data frequency to be modulated to a unique amplitude.

16. The digital data transmission system of claim 14, wherein the value range of the parallel digital data pattern comprises a plurality of value groups, each value within each value group causing said data frequency to be modulated to a unique amplitude, and wherein the amplitude of said clock frequency identifies the value group being transmitted and received.

* * * * *